United States Patent
Black et al.

[15] 3,683,790
[45] Aug. 15, 1972

[54] RECIRCULATION COFFEE BREWER

[72] Inventors: Stewart L. Black, Lee's Summit, Mo.; Spencer L. Childers, Fresno, Calif.; Leonard Bieri, Jr., Lee's Summit, Mo.

[73] Assignee: The Vendo Company, Kansas City, Mo.

[22] Filed: April 16, 1971

[21] Appl. No.: 134,799

[52] U.S. Cl..............................99/289, 99/300
[51] Int. Cl. ...........................................A47j 31/00
[58] Field of Search........99/289, 280, 299, 300, 307, 99/308, 309, 302

[56] References Cited

UNITED STATES PATENTS

| | | | |
|---|---|---|---|
| 3,103,873 | 9/1963 | Breitenstein | 99/302 |
| 3,349,690 | 10/1967 | Heier | 99/289 |
| 3,369,478 | 2/1968 | Black | 99/289 |
| 3,446,137 | 5/1969 | Pryor | 99/289 |

Primary Examiner—Robert W. Jenkins
Attorney—Schmidt, Johnson, Hovey & Williams

[57] ABSTRACT

Coffee or tea brewing and dispensing apparatus wherein hot water and fresh beverage grounds are delivered into an open top receptacle and the brewed beverage drawn from the bottom thereof through a filter comprising wet coffee grounds supported on a foraminous screen by a suction pump in a recirculation and delivery line coupled to the bottom of the receptacle. A discharge spout connected to the line downstream of the pump is mounted for shifting movement from a position for returning brewed beverage back into the receptacle to an alternate position for delivering the beverage to a dispensing station. The receptacle is selectively movable away from the screen through a displacement to permit removal of grounds therefrom by a scraper blade shiftable across the upper face of the screen. A series of cams and associated followers driven by a single motor sequentially operate the components of the apparatus by controlling introduction of water and fresh grounds into the receptacle, effecting predetermined recirculation of the brewed beverage, then diverting the spout to the delivery position thereof and finally elevating the receptacle and causing the scraper to remove grounds from the screen.

10 Claims, 10 Drawing Figures

Stewart L. Black
Spencer L. Childers
Leonard Bieri, Jr.
INVENTORS.

BY
Schmidt, Johnson, Hovey & Williams
ATTORNEYS.

PATENTED AUG 15 1972

Stewart L. Black
Spencer L. Childers
Leonard Bieri, Jr.
INVENTORS.

BY
Schmidt, Johnson, Hovey & Williams
ATTORNEYS.

PATENTED AUG 15 1972

Stewart L. Black
Spencer L. Childers
Leonard Bieri, Jr.
INVENTOR.

BY

*Schmidt, Johnson, Hovey & Williams*
ATTORNEYS.

RECIRCULATION COFFEE BREWER

This invention relates to apparatus for preparing a hot beverage such as coffee or tea and particularly to a brewing and dispensing unit wherein the strength of the beverage may be selectively controlled and wherein good clarity of the beverage is maintained notwithstanding the fact that any need for providing filter paper, as has been the case with prior units, has been eliminated. The brewing mechanism is adapted to effect recirculation of the brewed beverage for a selectively variable time interval for controlling the strength of the beverage to meet a particular product flavor demand.

Machines adapted to dispense a hot beverage into a disposable cup upon insertion of proper monetary deposit in the unit have long been in commercial use and have met widespread acceptance. Certain of these machines have been provided with components designed to brew a relatively large volume of beverage during each brewing cycle and then dispense individual cup volumes from the previously prepared bulk supply thereof upon demand. This type of machine is satisfactory for those locations where high demand is found, especially during short intervals of time such as a lunch break or the like. However, best overall results have been obtained when the machine is capable of preparing and dispensing a single cup of beverage for each monetary deposit in the machine. In order to obtain a product of desired strength though, the brewing cycle must necessarily be of sufficient length for adequate extraction of the soluble constituents of the fresh beverage grounds for most desirable flavor. The longer this cycle, however, the slower the machine will be in dispensing individual drinks and the more impatient customers become in operating the machine, particularly when a line of customers are waiting to obtain a product from the dispensing machine.

One way of increasing the dispensing rate by significantly lessening the brewing time without sacrifice in product strength is to move the hot water through the beverage grounds using high water flow rates. However, this solution to the overall problem in itself creates a problem in that forcing the brewing liquid through the grounds and the required underlying filter structure at a high rate tends to cause small particles of the grounds to be carried with the liquid and thereby produce a cloudy product. In the past, product clarity has been retained under these circumstances only by using disposable filter paper as the filtering medium and with the paper being advanced step by step following each brewing operation.

It is therefore an important object of this invention to provide beverage brewing and dispensing apparatus wherein a short cycle full flavor beverage product is prepared by recirculating the product through the fresh beverage grounds with the need for filter paper or the like being eliminated without sacrifice of brew clarity by virtue of recirculation of the liquid through the compacted wet grounds to filter out the finer particles in the beverage and assure final delivery of a clear product of desired strength.

Another important object of the invention is to provide brewing and dispensing apparatus for hot beverages as described wherein recirculation of the brewed beverage is accomplished by a conduit leading from the screen to a discharge spout shiftably positioned above the open top receptacle and movable from a position for discharging the beverage back into the brewing receptacle to a second position for delivering the brewed beverage to a product dispensing station whereby a pump interposed in the recirculation line may be used to recirculate the brewed beverage at a high rate while at the same time permitting variable control over the brewing period by virtue of the simple expedient of controlling the time at which the recirculation discharge spout is shifted from its position overlying the brewing receptacle to the discharge position thereof over the dispensing station.

A still further important object of the invention is to provide beverage brewing and dispensing apparatus wherein timing of the entire operating cycle is controlled by a motor, which also powers diversion of the discharge spout of the recirculation system, movement of the receptacle relative to the screen and cleaning of grounds from the screen underlying the receptacle.

Other important objects of the invention will become apparent or be explained in detail as the specific description of the invention in its preferred form proceeds hereunder.

Figure 6:
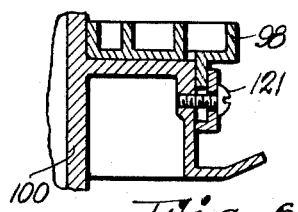
Figure 3:
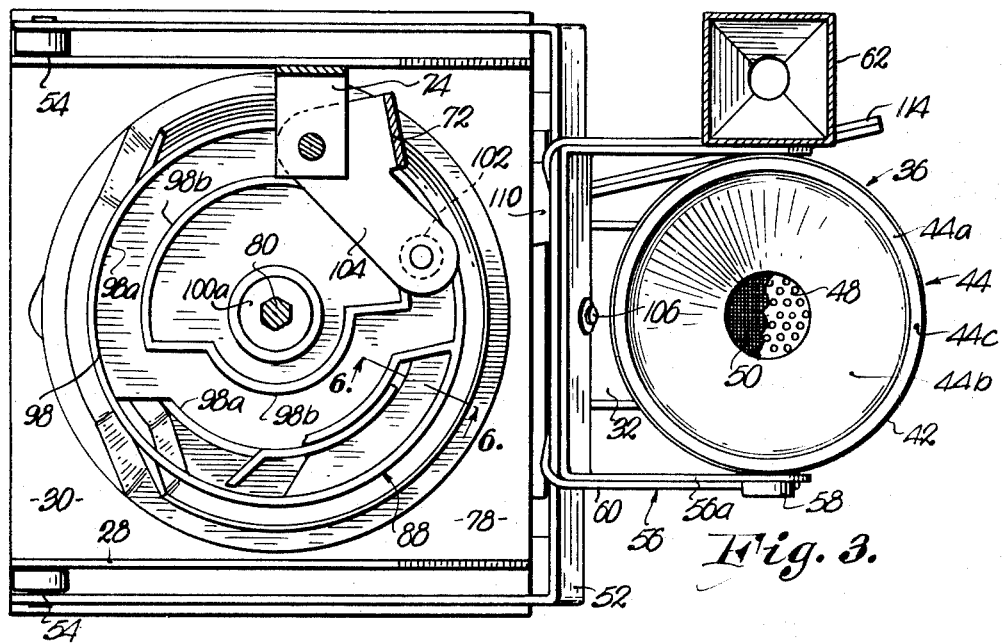
FIG. 3 is a horizontal cross-sectional view taken on irregular line 3—3 of FIG. 2 and looking downwardly in the direction of the arrows.
Figure 7:
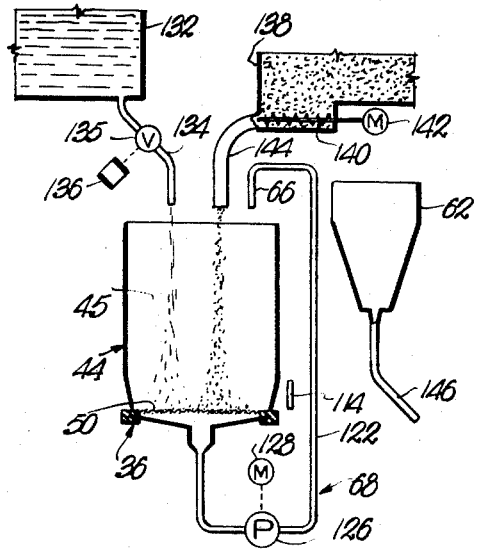
Figure 8:
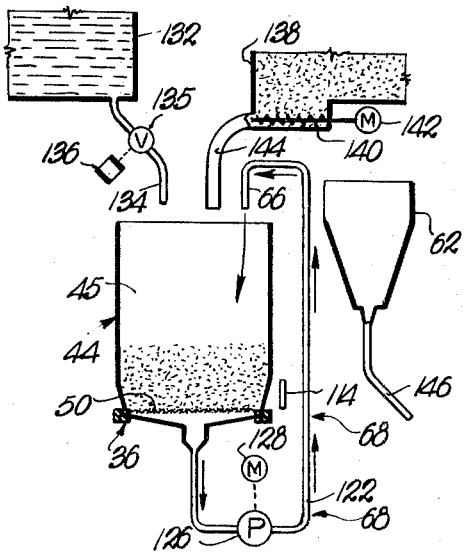
Figure 9:
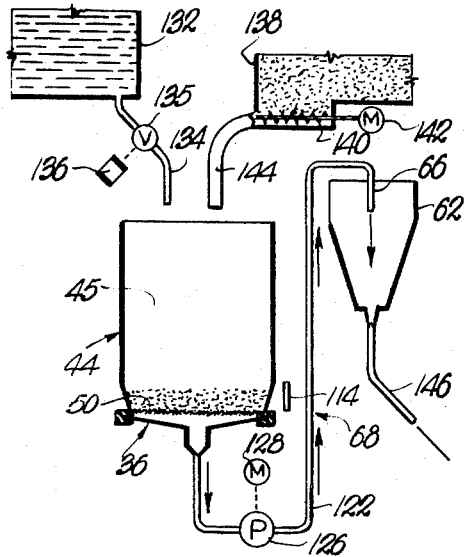
Figure 10:
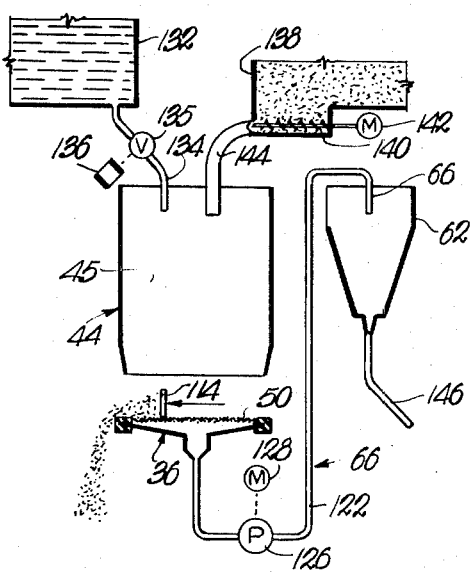

FIG. 6 is a fragmentary, enlarged cross-sectional view on line 6—6 of FIG. 3; and FIGS. 7, 8, 9 and 10 are essentially schematic representations of the beverage brewing apparatus showing the operating sequence thereof with water and fresh beverage grounds being introduced into the brewing receptacle in FIG. 7, recirculation of the brewed beverage being indicated schematically in FIG. 8, while FIG. 9 shows the way in which brewed beverage is diverted to the dispensing station during recirculation thereof, and the step of removing beverage grounds from the filter medium of the apparatus being illustrated in FIG. 10.

Beverage brewing and dispensing apparatus 20 is mounted on a base assembly 22 having a horizontal floor 24 supported by a pair of upright sidewalls 26 and 28 which are joined adjacent the upper extremities by horizontal top wall 30. A downwardly opening channel-shaped member 32 carried by bottom wall 24 equidistantly between upright sidewalls 26 and 28 has a forwardmost portion 32a which projects ahead of the upright vertical front wall 34 (FIG. 2) and serves as means for supporting a circular bottom assembly broadly designated 36.

Figure 2:
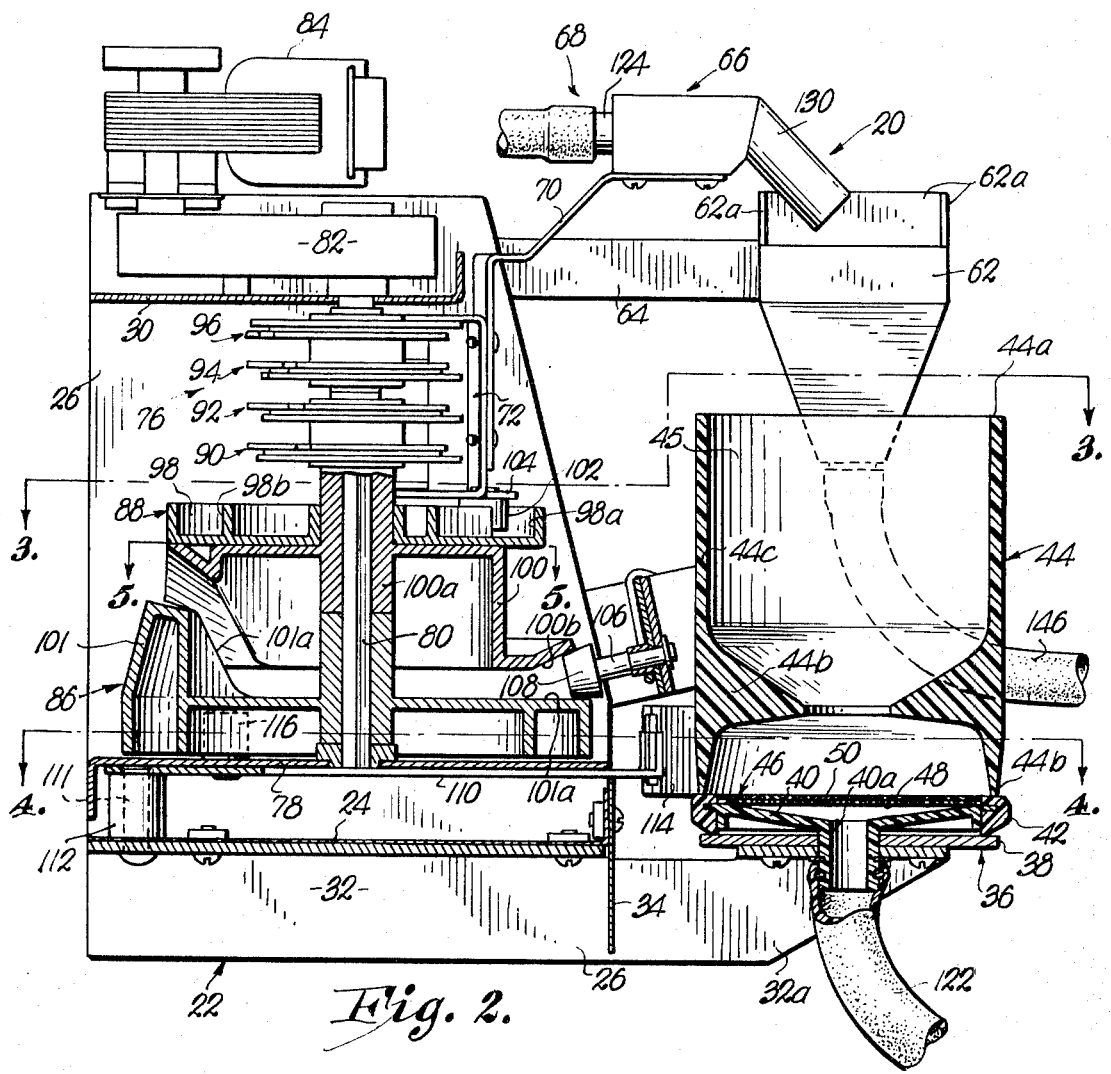
FIG. 2 is a vertical cross-sectional view taken substantially on line 2—2 of FIG. 1 (with the exception of the switch control cams which are shown in elevation for clarity)
Figure 4:
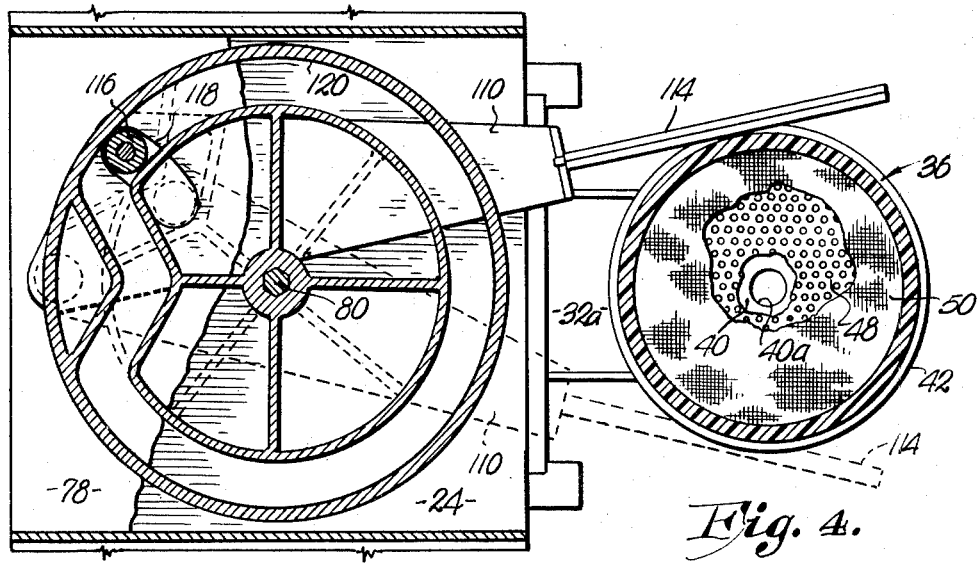
FIG. 4 is a horizontal cross-sectional view taken on line 4—4 of FIG. 2 looking downwardly.

As is best illustrated in FIGS. 2 and 4, bottom assembly 36 includes an annular support plate 38 which carries an inverted conical or funnel-shaped element 40 provided with a downwardly extending cylindrical section 40a which projects through the central aperture in plate 38. Annular gasket 42 carried by the circular edge of element 40 not only is adapted to seal against the lower cylindrical margin of brewing receptacle 44 but also acts as a retainer for the unit 46 made up of a perforated circular plate 48 underlying and supporting a fine mesh screen 50, which may be of stainless steel.

The cylindrical receptacle 44 has an inlet opening 44a, an annular, inclined flow diverting boss 44b integral with the sidewall 44c of the receptacle, and a relatively sharp lower circular edge 44d defining an outlet opening and normally engaging the upper annular face of gasket 42 in fluid-tight sealing relationship thereto. The receptacle 44 thus provides an extraction chamber 45 between and in continuous open communication with the inlet 44a and the outlet 44d.

Receptacle 44 is swingably mounted on base assembly 22 for movement toward and away from bottom assembly 36 by virtue of the U-shaped member 52 pivotally mounted on horizontal opposed pivot pins 54 carried by sidewalls 26 and 28 adjacent the rear upright margins thereof. Another U-shaped element 56 secured to the bight of member 52 carries receptacle 44 on the forwardmost ends of the outstanding arm portions 56a thereof by virtue of the provision of opposed, horizontal, coaxial pins 58 connected to the body 44c of receptacle 44 and trapped in suitable downwardly opening slots in arm portions 56a by spring retainers 60 on member 56.

A pyramidal-shaped funnel 62 is mounted to one side of receptacle 44 proximal to the top thereof and is held stationary with respect to the receptacle by a horizontal support arm 64 secured to sidewall 26 proximal to the top margin thereof (FIG. 2). It is to be noted from FIGS. 1 and 2 that the uppermost part of the funnel 62 has three upwardly extending sides 62a but that the side closest to receptacle 44 terminates at an elevation lower than the other three sides of the receptacle to present a rectangular opening for clearing the discharge spout 66 of a recirculation unit 68 forming a part of apparatus 20.

L-shaped support arm 70 carried by the swingable U-shaped bracket 72 pivotal on a vertical pin extending from upper wall 30 to a bracket member 74 therebelow (FIG. 3), serves as a mount for discharge spout 66 for movement between alternate positions overlying receptacle 44 or discharge funnel 62. The power driven cam assembly 76 carried between upper wall 30 and the horizontal cam support wall 78 includes a tranversely polygonal, vertically oriented drive shaft 80 carried by bearings at opposite ends thereof for rotation about its longitudinal axis. The uppermost end of shaft 80 is operably coupled to gear structure 82 supported by top wall 30 and operably driven by electric motor 84. Mounted on shaft 80 for rotation therewith are two lower main cam sections 86 and 88 which underlie four switch actuating cams 90, 92, 94 and 96.

Figure 1:
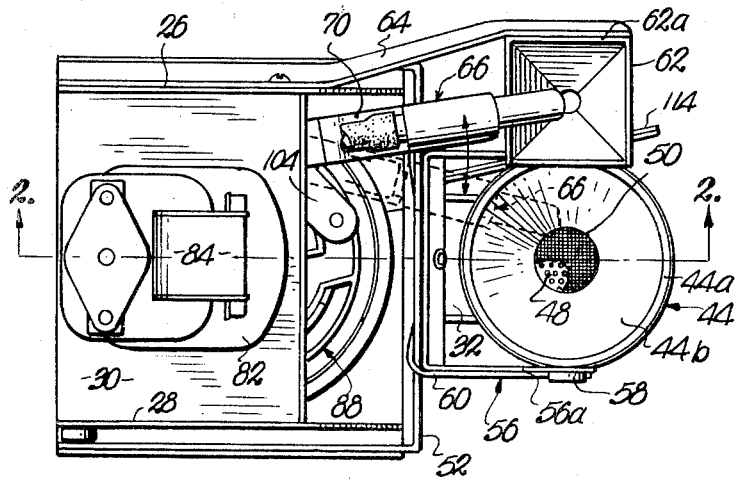
FIG. 1 is a top plan view of the primary operating components of brewing and dispensing apparatus for hot beverages constructed in accordance with the preferred concepts of this invention.

The upper cam section 88 has an upwardly opening, annular track 98 (FIGS. 1–3). Cam section 88 is mounted on the tubular boss portion 100a of cam section 86, which boss portion is mounted on shaft 80.

Section 88 has wall portions 98a and 98b which define the irregular cam track 98 as best shown in FIG. 3 for receiving follower 102 rotatably carried by extension 104 on element 72. During rotation of cam section 88, follower 102 is forced to move along the cam track 98 defined by walls 98a and 98b to effect oscillation of discharge spout 66 between alternate positions overlying funnel 62 and receptacle 44, during each 360° of rotation of the cam assembly 76.

Figure 5:
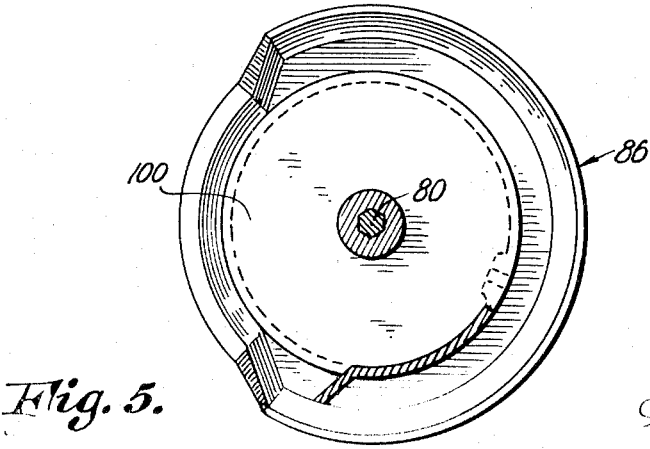
FIG. 5 is essentially a top plan view of the upper section of the lower cam taken as a cross-section upon line 5—5 of FIG. 2.

The mid-sections of U-shaped member 52 and element 56 serve to support shaft 106 (FIG. 2), which extends toward cam section 86 and carries a frusto-conical cam roller for follower 108. Cam section 86 has an upper portion 100 and a lower portion 101 having mutually cooperable cam surfaces 100b and 101a respectively, which maintain one level transversely of shaft 80 through an arc of about 240° and then rise abruptly as indicated in FIGS. 2 and 5 to another horizontal level extending through an arc of about 90°. The receptacle 44 is thereby maintained in fluid-sealing engagement with bottom assembly 36 while follower 108 rolls along the lower horizontal track level defined by cam sections 100 and 101, but is raised to a level above screen 50 as the follower climbs to the uppermost horizontal portion of the cam track during rotation of cam assembly 76.

Hub 112 of scraper blade mounting member 110 is pivotally carried by post 111 riveted to the midsection of channel 32. Supporting blade 114 is located to reciprocate across the upper face of screen element 50. Cam follower 116 projecting upwardly from member 110 and reciprocable in curved slot 118 in plate 78 is received within the downwardly opening cam track 120 presented in the underside of cam section 86. As is best shown in FIG. 4, cam track 120 is substantially circular throughout its angular extent, but has an inturned portion extending toward the axis of shaft 80 which causes member 110 and thereby scraper 114 to oscillate through an arc whereby blade 114 traverses the upper surface of screen element 50.

FIG. 6 is a fragmentary cross-sectional illustration of the structure for adjustably interconnecting cam unit 88 with cam unit 86 through the provision of fastening means 121. The relative position of cam section 88 determines the cut-off point of brew recirculation and, therefore, the brew strength.

As illustrated in FIGS. 2 and 7–10 inclusive, recirculation unit 68 includes a flexible line 122 joining the tubular boss 40a of bottom assembly 36 with tubular extension 124 of spout 66. A pump 126 is interposed in line 122 with the suction thereof connected to bottom assembly 36 while the discharge of the pump leads to spout 66. Pump 126 is driven by motor 128 under the control of a switch actuated by one of the cams 90–96. It is to be noted from FIG. 2 that the discharge end 130 of spout 66 is inclined downwardly to direct liquid either into the funnel 62 as shown in the full line illustration of FIG. 1, or into the receptacle 44 when in the dotted line position of the same as illustrated in the same figure.

Apparatus 20 is also provided with a hot water supply tank 132 provided with a line 134 leading therefrom for discharge of hot water into receptacle 44. Valve 135 under the control of solenoid 136 actuated by one of the cams 90–96 permits selective control of the amount of water delivered to the brewing receptacle. Similarly, fresh beverages grounds storage compartment 138 is provided with an auger 140 therein driven by motor 142 also under the control of one of the cams 90–96 so that a selected amount of fresh grounds may be delivered into receptacle 44 via supply tube 144. The brewed beverage is delivered from funnel 62 to the dispensing station through conduit 146.

OPERATION

An operating cycle of apparatus 20 is initiated by energization of motor 84 through a conventional coin deposit responsive or manually switched power circuit. Activation of motor 84 starts rotation of shaft 80, which carries cams 86, 88, 90, 92, 94 and 96. One of the cams 90–96, say cam 90, controls and promptly closes a conventional holding switch coupled with the power circuit for motor 84 to maintain the latter energized during the full revolution of shaft 80 required for completing an operating cycle of apparatus 20.

With follower 108 in track 100b–101a of cam 86 holding receptacle 44 in sealed relationship upon bottom assembly 36 and follower 116 in track 120 of cam 86 holding scraper blade 114 in its withdrawn position, another of the cams 90–96, say cam 92, controls a power circuit switch for energizing solenoid 136 to open valve 135 for a predetermined period to discharge a predetermined quantity of brewing water into receptacle 44 through line 134, while still another of cams 90–96, say cam 94, controls a power circuit switch for energizing motor 142 to operate auger 140 for a predetermined period to discharge a predetermined quantity of fresh grounds into receptacle 44 through tube 144.

With follower 102 in track 98 of cam 88 holding spout 66 in its position overlying receptacle 44 for recirculating flow of liquid from spout 66 back into receptacle 44, the remaining of cams 90–96, say cam 96, operates to energize a power circuit switch for actuating motor 128 to operate recirculation and delivery pump 126.

The suction of pump 126 draws liquid in receptacle 44 through the grounds retained on top of screen 50, thence out of the bottom assembly 36, from which the liquid is pumped through line 122 and discharged from spout 66. While the spout 66 remains disposed over receptacle 44, the liquid is thus recirculated through the receptacle 44 and the grounds in the latter to accomplish both brewing and filtering of the liquid.

After the brewing and filtering or recirculation portion of the cycle has been continued for the desired period of time, the rotation of shaft 80 will have turned cam 88 sufficiently for follower 102 in track 98 to then be shifted to move spout 66 to its delivery position overlying funnel 62 for discharge of brewed and filtered beverage liquid into funnel 62, from which such liquid is delivered to a cup or the like through conduit 146. It should be noted that the cam 96 operates to maintain the pump 126 in operation during the delivery portion of the cycle just described and for a sufficient period to assure delivery of all of the liquid from the receptacle 44 to the funnel 62.

After completion of the delivery portion of the cycle, the cam 96 operates to de-energize the pump motor 128, while the cam 88 maintains the spout 66 in its delivery position over funnel 62 and, therefore, shifted away from its recirculation position overlying the receptacle 44. Continued rotation of the shaft 80 then causes cam 86 to move follower 108 in track 100b–100a so as to swing member 52 and element 56 upwardly to move the receptacle 44 out of sealing relationship with the bottom assembly 36 and to a position spaced above the latter sufficiently for clearing the scraper blade 114. Further rotation of the shaft 80 then causes cam track 120 in the lower portion of cam 86 to move cam follower 116 to swing the member 110 so that the scraper blade 114 will be moved across the upper face of screen 50 to displace spent beverage grounds therefrom, such grounds being scraped off of the top of screen 50 and permitted to fall into a suitable collection vessel therefor located beneath the bottom assembly 36. After the scraping stroke of blade 114, the lower portion of cam 86 operates to return the member 110 and blade 114 to their standby positions.

It will be understood that the operating cycle is completed when the shaft 80 has finished one full revolution, at which time the cam 90 controlling the holding switch for motor 84 will open the power circuit to the motor 84 to restore the apparatus 20 to its standby condition, in which it will be ready for initiation of another cycle upon activation by proper coinage deposit or the like. At the end of the scraping portion of the cycle described above, however, it will be noted that the receptacle 44 was in its raised position relative to bottom assembly 36, and the spout 66 was disposed in its delivery position overlying funnel 62. It will be apparent that the receptacle 44 should be returned to its lowered sealed relationship with bottom assembly 36 before valve 135 and auger 140 are activated during the next cycle to discharge brewing water and grounds into the receptacle; it will be similarly apparent that the spout 66 must be shifted back to its recirculating position before the pump 126 is reactivated during the next brewing cycle. These steps of restoring the receptacle 44 and the spout 66 to the mentioned positions may be included in the cycle near the end thereof and just prior to the de-energization of the motor 84 by the cam 90 or, if desired, may be included in the early part of each cycle immediately after energization of the motor 84 by the cam 90 but prior to energization of the valve solenoid 136 and the auger motor 142, current preference being in favor of the latter mode of sequencing in order to permit an opportunity for air circulation through the raised receptacle 44 and across the top of the screen 50 following the scraping portion of the cycle and before initiation of the brewing portion of the next cycle. In either event, however, it will be understood that, at the appropriate time chosen, the follower 108 in track 100b–100a of cam 86 will cause the receptacle 44 to be returned to its sealed relationship upon the bottom assembly 36, and follower 102 in track 98 of cam 88 will return the spout 66 to its recirculating position overlying the receptacle 44.

Each cycle of operation of the apparatus 20, as above described, produces a fresh, well brewed and essentially clear beverage product in cup quantities and does so most efficiently by virtue of the effectiveness of the suction action employed to draw the beverage liquid through the wet grounds that are held by such suction atop the screen 50. This provides both an effective infusion of soluble beverage forming materials from the grounds into the liquid, while at the same time providing an extremely effective filtering of the liquid recirculated through such grounds to remove all but the very finest solid materials from the beverage liquid.

As previously noted, the strength or flavor of the beverage liquid is controlled in the apparatus 20 by the length of time during which the spout 66 remains in its recirculating position during operation of the pump 126, since the recirculatory brewing portion of the cycle is ended upon shifting of the spout 66 into its delivery position overlying the funnel 62. Thus, local preferences as to strength and taste may preferably be accommodated by appropriate selection or adjustment of the cam 88 with respect to the configuration of the track 98 thereof to provide the desired period of recirculation of the beverage liquid through the receptacle 44 prior to shifting of the spout 66 into its delivery position overlying funnel 62. Of course, others of the cams 92, 94 and 96 may be selectable or adjustable in conventional manner to provide variations required by local conditions, but it is currently deemed preferably to provide for desired variations in taste and strength of the beverage liquid by proper selection or adjustment of the cam 88, in order to maintain both the quantity of liquid to be brewed and the quantity of grounds to be employed for brewing and filtering purposes substantially constant.

In the preferred embodiment of the invention, the various portions of the operating cycle are easily accommodated in a period of about 15 seconds, during which the motor 84 rotates the shaft 80 and the cams 86, 88, 90, 92, 94 and 96 one full revolution. Approximately 10 seconds are devoted to the brewing and delivery portions of the cycle, with the remaining 5 seconds being employed for the cleaning and restoring portions of the cycle, including the raising of the receptacle 44, the activation of the scraper blade 114 and the return of same to its standby position, and the restoration of the receptacle 44 and spout 66 to their recirculatory brewing positions.

Those skilled in the art will appreciate that various modifications might be made in the details of the structure disclosed to illustrate a preferred embodiment of the invention without departing from the essential principles or spirit of the invention. Accordingly, the invention should be deemed limited only by the fair scope of the claims that follow.

Having thus described the invention, what is claimed as new and desired to be secured by Letters Patent is:

1. Beverage brewing and dispensing apparatus comprising:
   a source of brewing water;
   a source of brewable grounds;
   a beverage dispensing station;
   a brewing receptacle having inlet and outlet openings in the upper and lower portions thereof respectively;
   foraminous means normally extending across said outlet opening;
   means for delivering predetermined quantities of water and grounds from said sources thereof into said receptacle through said inlet opening;
   pump means having a suction intake and a pressure output;
   first conduit means coupling said suction intake into communication with said outlet opening of the receptacle;
   means for operating said pump means;
   a shiftable discharge spout;
   second conduit means coupling said pressure output with said spout; and
   means for shifting said spout between a recirculating position in which liquid is discharged from the spout into the receptacle through said inlet opening and a delivery position in which liquid is discharged from the spout to said dispensing station.

2. Apparatus as set forth in claim 1, wherein said suction intake and said outlet opening are normally placed in sealed communication with each other by said first conduit means.

3. Apparatus as set forth in claim 1, wherein said second conduit means includes a flexible portion.

4. Apparatus as set forth in claim 1, wherein said receptacle and said foraminous means are relatively movable away from each other, and there is provided means for scraping spent grounds from said foraminous means when said receptacle and said foraminous means are moved away from each other.

5. Apparatus as set forth in claim 4, wherein is provided means coupled with said receptacle for moving the latter away from said foraminous means.

6. Apparatus as set forth in claim 5, wherein is provided control means for successively activating said delivering means, said pump operating means, said shifting means, said receptacle moving means and said scraping means.

7. Apparatus as set forth in claim 6, wherein said control means continues to maintain said pump operating means activated during and for a predetermined period after activation of said shifting means.

8. Apparatus as set forth in claim 6, wherein said spout means is mounted for rotation relative to the receptacle and is provided with a discharge end located to overlie said inlet opening of the receptacle in said recirculating position thereof, and to overlie the dispensing station in said delivering position of the same, said control means including cam actuated elements operably coupled to said shifting means for rotating the spout means.

9. Apparatus as set forth in claim 8, wherein said dispensing station is provided with a funnel-shaped member adjacent the receptacle, located to receive beverage from the spout means when the latter is in said second position thereof, and adapted to direct beverage to a dispensing cup.

10. Apparatus as set forth in claim 1, wherein said spout is swingable relative to the receptacle about a vertical axis, and said receptacle is swingable relative to said foraminous means about a horizontal axis.

* * * * *